US012771809B2

(12) United States Patent
Shin

(10) Patent No.: US 12,771,809 B2
(45) Date of Patent: Oct. 20, 2026

(54) DETECTING THE PRESENCE OF A VIRTUAL MEETING PARTICIPANT

(71) Applicant: Google LLC, Mountain View, CA (US)

(72) Inventor: Dongeek Shin, San Jose, CA (US)

(73) Assignee: Google LLC, Mountain View, CA (US)

( * ) Notice: Subject to any disclaimer, the term of this patent is extended or adjusted under 35 U.S.C. 154(b) by 125 days.

(21) Appl. No.: 18/444,195

(22) Filed: Feb. 16, 2024

(65) Prior Publication Data

US 2025/0267240 A1 Aug. 21, 2025

(51) Int. Cl.
*H04N 7/15* (2006.01)
*G06T 7/50* (2017.01)

(52) U.S. Cl.
CPC ............... *H04N 7/157* (2013.01); *G06T 7/50* (2017.01)

(58) Field of Classification Search
None
See application file for complete search history.

(56) References Cited

U.S. PATENT DOCUMENTS 11,218,522 B1 * 1/2022 Yerli ........................ G06T 19/00
2015/0279118 A1 * 10/2015 Dou ........................ G06T 7/292 345/427
2015/0350769 A1 * 12/2015 Sun ...................... H04N 23/611 348/14.08
2017/0188008 A1 * 6/2017 Kim .......................... G06T 5/70
2019/0206119 A1 * 7/2019 Nam ........................ G06T 15/08
2019/0340306 A1 * 11/2019 Harrison .................. G06N 5/04
2021/0306173 A1 * 9/2021 Krikunov ............... G06V 40/20
2024/0320904 A1 * 9/2024 Barnett ...................... G06T 5/70
2025/0095246 A1 * 3/2025 Yamaguchi ............... G06T 5/77
2025/0166289 A1 * 5/2025 Di ............................. G06T 7/70

* cited by examiner

*Primary Examiner* — Duc Nguyen
*Assistant Examiner* — Assad Mohammed
(74) *Attorney, Agent, or Firm* — Lowenstein Sandler LLP

(57) ABSTRACT

A method for detecting the presence of a virtual meeting participant includes obtaining a first frame of a video stream generated by a camera of a client device of a participant of a virtual meeting. The method includes generating a depth map of the first frame. The method includes, for each of one or more second frames of the video stream, generating a point cloud of an image of the participant located in a respective second frame, and determining whether the participant is in front of the camera based on an overlap between a selected zone of the depth map and the point cloud of the image of the participant located in the respective second frame. Responsive to the determining the participant is not in front of the camera, the method includes muting the participant's audio and deactivating the participant's video stream.

16 Claims, 8 Drawing Sheets

DETECTING THE PRESENCE OF A VIRTUAL MEETING PARTICIPANT

TECHNICAL FIELD

Aspects and implementations of the present disclosure relate to virtual meetings and more specifically to detecting the presence of a virtual meeting participant.

BACKGROUND

Virtual meetings can take place between multiple participants via a virtual meeting platform. A virtual meeting platform can include tools that allow multiple client devices to be connected over a network and share each other's audio (e.g., voice of a user recorded via a microphone of a client device) and/or video stream (e.g., a video captured by a camera of a client device, or video captured from a screen image of the client device) for efficient communication. To this end, the virtual meeting platform can provide a user interface that includes multiple regions to present the video stream of each participating client device.

SUMMARY

The below summary is a simplified summary of the disclosure in order to provide a basic understanding of some aspects of the disclosure. This summary is not an extensive overview of the disclosure. It is intended neither to identify key or critical elements of the disclosure, nor delineate any scope of the particular implementations of the disclosure or any scope of the claims. Its sole purpose is to present some concepts of the disclosure in a simplified form as a prelude to the more detailed description that is presented later.

An aspect of the disclosure provides a method for detecting the presence of a virtual meeting participant. The method may include obtaining a first frame of a video stream generated by a camera of a client device of a participant of a virtual meeting. The method may include generating a depth map of the first frame. For each of one or more second frames of the video stream, the method may include generating a point cloud of an image of the participant located in a respective second frame, and determining whether the participant is in front of the camera based on an overlap between a selected zone of the depth map and the point cloud of the image of the participant located in the respective second frame.

Another aspect of the disclosure provides a system for detecting the presence of a virtual meeting participant. The system includes a memory and one or more processing devices, coupled to the memory, configured to perform one or more operations. The operations may include obtaining a first frame of a video stream generated by a camera of a client device of a participant of a virtual meeting, The operations may include generating a depth map of the first frame. For each of one or more second frames of the video stream, the operations may include generating a point cloud of an image of the participant located in a respective second frame, and determining whether the participant is in front of the camera based on an overlap between a selected zone of the depth map and the point cloud of the image of the participant located in the respective second frame.

Another aspect of the disclosure provides another method for detecting the presence of a virtual meeting participant. The method may include obtaining a first frame of a video stream generated by a camera of a client device of a participant of a virtual meeting. The method may include generating a depth map of the first frame. The method may include designating a selected zone of the depth map based on content of the depth map. For each of one or more second frames of the video stream, the method may include generating a point cloud of an image of the participant located in a respective second frame, and determining whether the participant is in front of the camera based on an overlap between the selected zone of the depth map and the point cloud of the image of the participant located in the respective second frame.

BRIEF DESCRIPTION OF THE DRAWINGS

Aspects and implementations of the present disclosure will be understood more fully from the detailed description given below and from the accompanying drawings of various aspects and implementations of the disclosure, which, however, should not be taken to limit the disclosure to the specific aspects or implementations, but are for explanation and understanding only.

DETAILED DESCRIPTION

Figure 1:
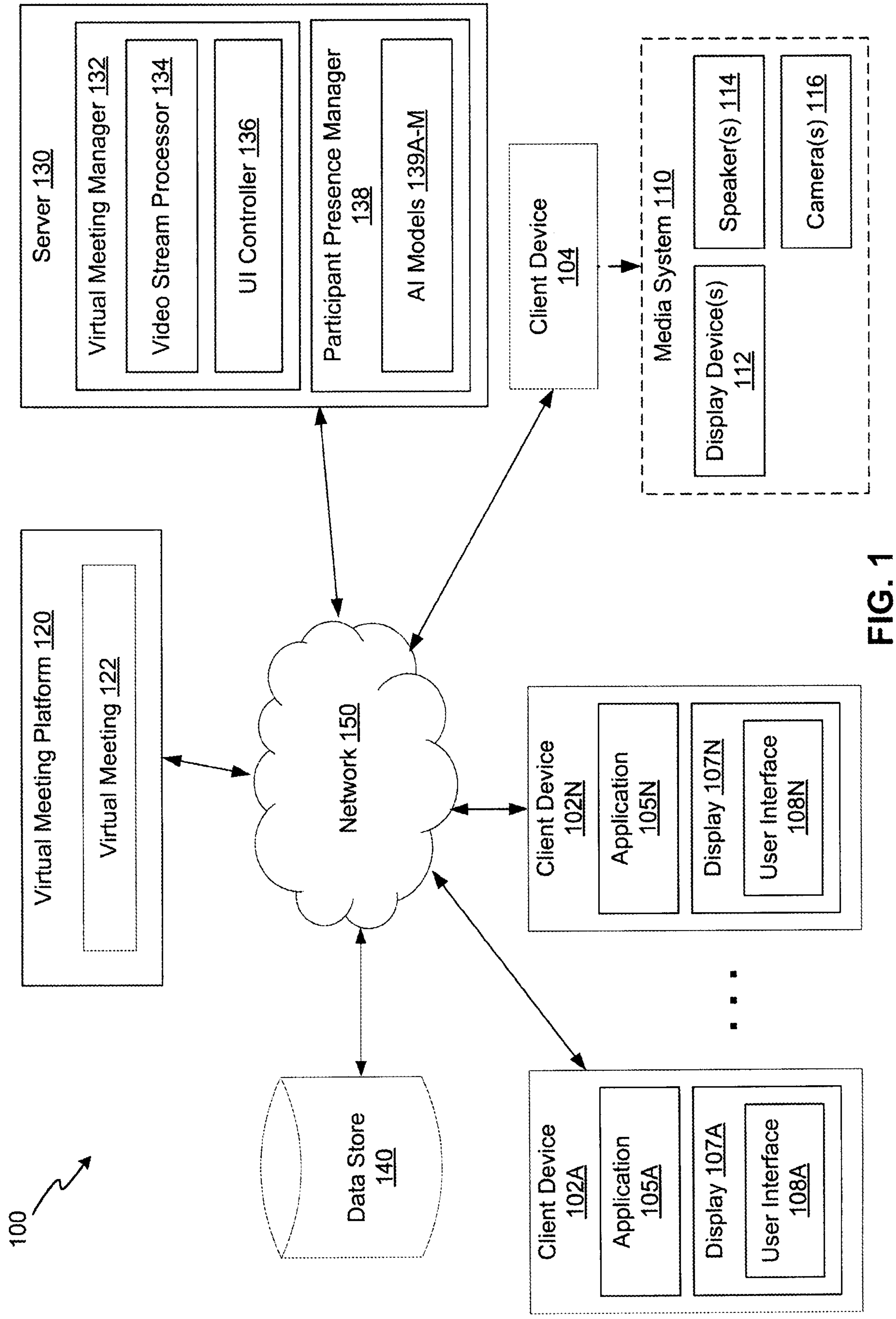
FIG. 1 illustrates an example system architecture for detecting the presence of a virtual meeting participant, in accordance with some implementations of the present disclosure.

Aspects of the present disclosure relate to detecting the presence of a virtual meeting participant during a virtual meeting. A virtual meeting platform can enable video-based conferences between multiple participants via respective client devices that are connected over a network and share each other's audio (e.g., voice of a user recorded via a microphone of a client device) and/or video streams (e.g., a video captured by a camera of a client device) during a virtual meeting. In some instances, a virtual meeting platform can enable a significant number of client devices (e.g., up to one hundred or more client devices) to be connected via the virtual meeting. A participant of a virtual meeting can speak to the other participants of the virtual meeting. Some existing virtual meeting platforms can provide a user interface (UI) to each client device connected to the virtual meeting, where the UI displays visual items corresponding to the video streams shared over the network in a set of regions in the UI.

In a typical virtual meeting, a participant mutes a microphone or a camera of the participant's client device by interacting with a UI of the virtual meeting (e.g., by using a "mute" button or a "video off" button) when the participant no longer wishes to be heard or seen by other participants. The participant may mute the microphone or the camera, e.g., to answer the door, answer the phone, or perform other tasks while participating in the virtual meeting. However, the participant may forget to mute the microphone or the camera, which may result in the participant unintentionally broadcasting video or audio to the virtual meeting. This can be distracting for other virtual meeting participants.

Implementations of the present disclosure address the above and other deficiencies by detecting whether a virtual meeting participant is not present in front of the participant's camera (or some other location) and automatically muting the microphone or the camera of the participant's client device during a virtual meeting. In particular, a participant presence manager of a virtual meeting platform can obtain a first frame from a video stream generated by the camera of the client device of the participant. The participant presence manager can generate a depth map of the first frame. The participant presence manager can use a generative diffusion artificial intelligence (AI) model to generate the depth map. The participant presence manager can, for each of one or more second frames, generate a point cloud of an image of the participant located within the respective second frame. The participant presence manager can use a second generative diffusion AI model to generate the point cloud. The participant presence manager can then determine whether the participant is in front of the client device's camera based on an overlap between (1) a selected zone of the depth map, and (2) the point cloud of the image of the participant. If the participant is not sufficiently in front of the camera, the participant presence manager can cause a virtual meeting application of the client device to mute the device's microphone and/or the camera.

Aspects of the present disclosure provide technical advantages over previous solutions. Aspects of the present disclosure can provide additional functionality to a virtual meeting platform by automatically detecting the presence of a virtual meeting participant in order to determine whether to mute a microphone or a camera of the participant's client device. This automated detection functionality, in some implementations, may use generative AI to assist in the detection of the presence of the participant. This may allow the virtual meeting platform to detect the presence of the participant without using specialty equipment, such as depth cameras, which may allow the functionality to be provided on a wider variety of client devices. Furthermore, aspects of the present disclosure can provide an improved user experience during virtual meetings by automatically muting a microphone or a camera of a participant's client device, which results in less distractions and disruptions for other virtual meeting participants.

FIG. 1 illustrates an example system architecture 100, in accordance with implementations of the present disclosure. The system architecture 100 includes one or more client devices 102A-102N or 104, a virtual meeting platform 120, a server 130, and a data store 140, each connected to a network 150.

In some implementations, the virtual meeting platform 120 enables users of one or more of the client devices 102A-102N, 104 to connect with each other in a virtual meeting (e.g., a virtual meeting 122). A virtual meeting 122 refers to a real-time communication session such as a video-based call or video chat, in which participants can connect with multiple additional participants in real-time and be provided with audio and video capabilities. A virtual meeting 122 may include an audio-based call or chat, in which participants connect with multiple additional participants in real-time and are provided with audio capabilities. Real-time communication refers to the ability for users to communicate (e.g., exchange information) instantly without transmission delays and/or with negligible (e.g., milliseconds or microseconds) latency. The virtual meeting platform 120 can allow a user of the virtual meeting platform 120 to join and participate in a virtual meeting 122 with other users of the virtual meeting platform 120 (such users sometimes being referred to, herein, as "virtual meeting participants" or, simply, "participants"). Implementations of the present disclosure can be implemented with any number of participants connecting via the virtual meeting 122 (e.g., up to one hundred or more).

In implementations of the disclosure, a "user" or "participant" can be represented as a single individual. However, other implementations of the disclosure encompass a "user" being an entity controlled by a set of users or an organization and/or an automated source such as a system or a platform. In situations in which the systems discussed here collect personal information about users, or can make use of personal information, the users can be provided with an opportunity to control whether the virtual meeting platform 120 or the virtual meeting manager 132 collects user information (e.g., information about a user's social network, social actions or activities, profession, a user's preferences, or a user's current location), or to control whether or how to receive content from the virtual meeting platform 120 or the virtual meeting manager 132 that can be more relevant to the user. In addition, certain data can be treated in one or more ways before it is stored or used, so that personally identifiable information is removed. For example, a user's identity can be treated so that no personally identifiable information can be determined for the user, or a user's geographic location can be generalized where location information is obtained (such as to a city, ZIP code, or state level), so that a particular location of a user cannot be determined. Thus, the user can have control over how information is collected about the user and used by the virtual meeting platform 120 or the virtual meeting manager 132.

In some implementations, the server 130 includes a virtual meeting manager 132. The virtual meeting manager 132, in one or more implementations, is configured to manage a virtual meeting 122 between multiple users of the virtual meeting platform 120. The virtual meeting manager 132 can provide the UIs 108A-108N to each client device 102A-N, 104 to enable users to watch and listen to each other during a virtual meeting 122. The virtual meeting manager 132 can also collect and provide data associated with the virtual meeting 122 to each participant of the virtual meeting 122. In some implementations, the virtual meeting manager 132 provides the UIs 108A-108N for presentation by client applications 105A-N. For example, the respective UIs 108A-108N can be displayed on the display devices 107A-107N by the client applications 105A-N executing on the operating systems of the client devices 102A-102N, 104. In some implementations, the virtual meeting manager 132 determines visual items for presentation in the UIs 108A-108N during a virtual meeting. A visual item can refer to a UI element that occupies a particular region in the UI and is dedicated to presenting a video stream from a respective client device. Such a video stream can depict, for example, a user of the respective client device 102A-N, 104 while the user is participating in the virtual meeting 122 (e.g., speaking, presenting, listening to other participants, watching other participants, etc., at particular moments during the virtual meeting 122), a physical conference or meeting room (e.g., with one or more participants present), a document or media content (e.g., video content, one or more images, etc.) being presented during the virtual meeting 122, etc.

In some implementations, the virtual meeting manager 132 includes a video stream processor 134 and a UI controller 136. Each of the video stream processor 134 or the UI controller 136 may include a software application (or a subset thereof) that performs certain virtual meeting functionality for the virtual meeting manager 132. The video stream processor 134 may be configured to receive video streams from one or more of the client devices 102A-102N, 104. The video stream processor 134 may be configured to determine visual items for presentation in the UI of such client devices 102A-N, 104 (e.g., the UIs 108-108N, discussed below) during the virtual meeting 122. Each visual item can correspond to a video stream from a client device 102A-N, 104 (e.g., the video stream pertaining to one or more participants of the virtual meeting 122). In some implementations, the video stream processor 134 receives audio streams associated with the video streams from the client devices (e.g., from an audiovisual component of the client devices 102A-102N, 104). Once the video stream processor 134 has determined visual items for presentation in the UI, the video stream processor 134 can notify the UI controller 136 of the determined visual items. The visual items for presentation can be determined based on current speaker, current presenter, order of the participants joining the virtual meeting 122, list of participants (e.g., alphabetical), etc.

In some implementations, the UI controller 136 provides the UI for the virtual meeting 122. The UI can include multiple regions. Each region can display a video stream pertaining to one or more participants of the virtual meeting 122. The UI controller 136 can control which video stream is to be displayed by providing a command to one or more client devices 102A-102N, 104 that indicates which video stream is to be displayed in which region of the UI (along with the received video and audio streams being provided to the client devices 102A-102N, 104). For example, in response to being notified of the determined visual items for presentation in the UI 108A-108N, the UI controller 136 can transmit a command causing each determined visual item to be displayed in a region of the UI and/or rearranged in the UI.

In one or more implementations, the virtual meeting manager 132 includes a participant presence manager 138. The participant presence manager 138 may include a software application (or a subset thereof) that performs certain virtual meeting functionality for a virtual meeting manager 132. The participant presence manager 138 may be configured to detect whether a virtual meeting participant is present in front of the camera of the participant's client device 102A-N, 104, and if the participant is not present, the participant presence manager 138 can cause the application 105A-N of the participant's client device 102A-N, 104 to mute the microphone and/or camera of the client device 102A-N, 104. The participant presence manager 138 may include one or more generative AI models 139A-M that the participant presence manager 138 can use to detect the presence of the participant. Functionality of the participant presence manager 138 is discussed further below in relation to FIGS. 2 and 7.

In some implementations, each of the virtual meeting platform 120 or the server 130 include one or more computing devices (such as a rackmount server, a router computer, a server computer, a personal computer, a mainframe computer, a laptop computer, a tablet computer, a desktop computer, etc.), data stores (e.g., hard disks, memories, databases), networks, software components, and/or hardware components that can be used to enable a user to connect with other users via a virtual meeting 122. The virtual meeting platform 120 can also include a website (e.g., one or more webpages) or application back-end software that can be used to enable a user to connect with other users by way of the virtual meeting 122.

In some implementations, the one or more client devices 102A-102N each include one or more computing devices such as personal computers (PCs), laptops, mobile phones, smart phones, tablet computers, netbook computers, network-connected televisions, etc. The one or more client devices 102A-102N can also be referred to as "user devices." Each client device 102A-102N can include an audiovisual component that can generate audio and video data to be streamed to the virtual meeting manager 132. The audiovisual component can include a device (e.g., a microphone) to capture an audio signal representing speech of a user and generate audio data (e.g., an audio file or audio stream) based on the captured audio signal. The audiovisual component can include another device (e.g., a speaker) to output audio data to a user associated with a particular client device 102A-102N. In some implementations, the audiovisual component includes an image capture device (e.g., a camera) to capture images and generate video data (e.g., a video stream) of the captured data of the captured images.

In some implementations, the system architecture 100 includes a client device 104. The client device 104 can differ from a client device of the one or more client devices 102A-N because the client device 104 may be associated with a physical conference or meeting room. Such client device 104 can include or be coupled to a media system 110 that can include one or more display devices 112, one or more speakers 114 and one or more cameras 116. Display device 112 can be, for example, a smart display or a non-smart display (e.g., a display that is not itself configured to connect to the network 150). Users that are physically present in the room can use the media system 110 rather than their own devices (e.g., one or more of the client devices 102A-102N) to participate in the virtual meeting 122, which can include other remote users. For example, the users in the room that participate in the virtual meeting 122 can control the display device 112 to show a slide presentation or watch slide presentations of other participants. Sound and/or camera control can similarly be performed. Similar to client devices 102A-102N, the one or more client devices 104 can generate audio and video data to be streamed to the virtual meeting manager 132 (e.g., using one or more microphones, speakers 114 and cameras 116).

As described previously, an audiovisual component of each client device 102A-N, 104 can capture images and generate video data (e.g., a video stream) of the captured data of the captured images. In some implementations, the client devices 102A-102N, 104 transmit the generated video stream to virtual meeting manager 132. The audiovisual component of each client device 102A-N, 104 can also capture an audio signal representing speech of a user and generate audio data (e.g., an audio file or audio stream)

based on the captured audio signal. In some implementations, the client devices 102A-102N, 104 transmit the generated audio data to the virtual meeting manager 132.

In some implementations, each client device 102A-102N or 104 includes a respective client application 105A-N, which can be a mobile application, a desktop application, a web browser, etc. The client application 105A-N can present, on a display device 107-107N of a client device 102A-102N or a UI (e.g., a UI of the UIs 108A-108N), one or more features of the application 105A-N for users to access the virtual meeting platform 120. For example, a user of client device 102A can join and participate in the virtual meeting 122 via a UI 108A presented on the display device 107A by the application 105A. The user can present a document to participants of the virtual meeting 122 using the UI 108A. Each of the UIs 108A-108N can include multiple regions to present visual items corresponding to video streams of the client devices 102A-102N provided to the server 130 for the virtual meeting 122.

In one or more implementations, the participant presence manager 138 is part of a client device 102A-102N, 104. For example, the application 105A-N can include the participant presence manager 138, which can detect whether a virtual meeting participant is present in front of the camera of the participant's client device 102A-N, 104, and if the participant is not present, the application 105A-N can mute the microphone of the client device 102A-N, 104 and/or the camera of the client device 102A-N, 104. If the participant presence manager 138 detects that the participant is present in front of the camera of the participant's client device 102A-N, 104, the application 105A-N can send the video stream to the virtual meeting manager 132, which can use the UI controller 136 to generate the virtual meeting UIs and provide the UIs to the client devices 102A-102N, 104. In some implementations, the application 105A sends the video stream to the other client devices 102B-N, 104, and receives the video streams from the other client devices 102B-N, 104, and the applications 105A-105N can generate their respective virtual meeting UIs 106A-106N or can finalize their respective UIs 106A-106N, which may have been partially generated by the UI controller 136.

In some implementations, the data store 140 is a persistent storage that is capable of storing data as well as data structures to tag, organize, and index the data. A data item can include audio data and/or video stream data, in accordance with implementations described herein. The data store 140 can be hosted by one or more storage devices, such as main memory, magnetic or optical storage-based disks, tapes, hard drives, flash memory, and so forth. In some implementations, the data store 140 is a network-attached file server, while in other implementations, the data store 140 is some other type of persistent storage such as an object-oriented database, a relational database, and so forth, that can be hosted by the virtual meeting platform 120 or one or more different machines (e.g., the server 130) coupled to the virtual meeting platform 120 using the network 150. In some implementations, the data store 140 stores portions of audio and video streams received from one or more client devices 102A-102N, 104 for the virtual meeting platform 120. Moreover, the data store 140 can store various types of documents, such as a slide presentation, a text document, a spreadsheet, or any suitable electronic document (e.g., an electronic document including text, tables, videos, images, graphs, slides, charts, software programming code, designs, lists, plans, blueprints, maps, etc.). These documents can be shared with users of the client devices 102A-102N, 104 and/or concurrently editable by the users.

In some implementations, the network 150 includes a public network (e.g., the Internet), a private network (e.g., a local area network (LAN) or wide area network (WAN)), a wired network (e.g., Ethernet network), a wireless network (e.g., an 802.11 network or a Wi-Fi network), a cellular network (e.g., a Long Term Evolution (LTE) network), routers, hubs, switches, server computers, and/or a combination thereof.

It should be noted that in some implementations, the functions of the virtual meeting platform 120 or the server 130 are provided by a fewer number of machines. For example, in some implementations, the server 130 is integrated into a single machine, while in other implementations, the server 130 is integrated into multiple machines. In addition, in one or more implementations, the server 130 is integrated into the virtual meeting platform 120.

In general, one or more functions described in the several implementations as being performed by the virtual meeting platform 120 or server 130 can also be performed by the client devices 102A-N, 104 in other implementations, if appropriate. In addition, in some implementations, the functionality attributed to a particular component can be performed by different or multiple components operating together. The virtual meeting platform 120 or the server 130 can also be accessed as a service provided to other systems or devices through appropriate application programming interfaces, and thus is not limited to use in websites.

Although implementations of the disclosure are discussed in terms of the virtual meeting platform 120 and users of the virtual meeting platform 120 participating in a virtual meeting 122, implementations can also be generally applied to any type of telephone call, conference call, or other technological communications methods between users. Implementations of the disclosure are not limited to virtual meeting platforms that provide virtual meeting tools to users.

Figure 2:
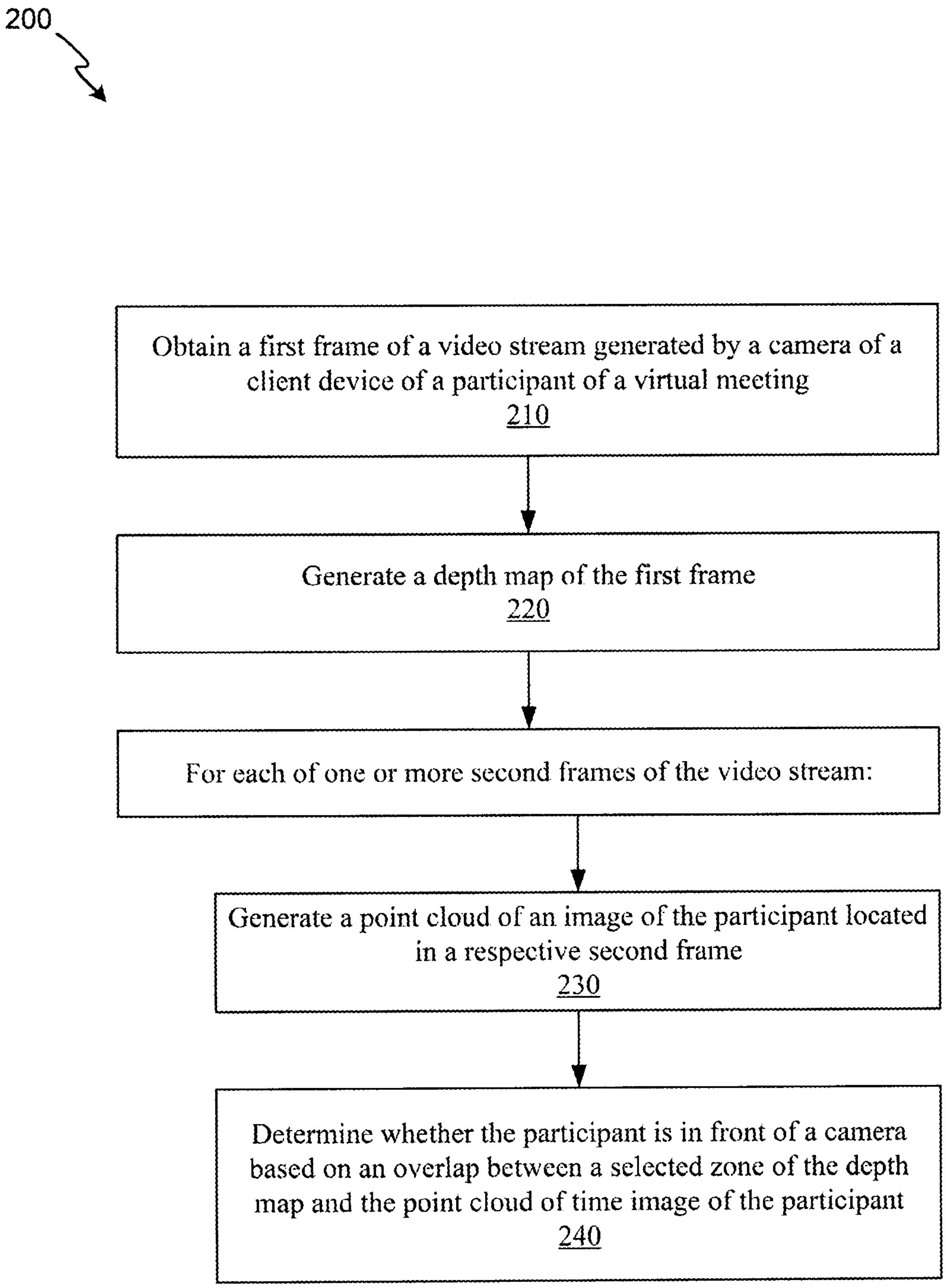
FIG. 2 depicts a flow diagram of a method for detecting the presence of a virtual meeting participant, in accordance with some implementations of the present disclosure.

FIG. 2 is a flowchart illustrating one embodiment of a method 200 for detecting the presence of a participant during a virtual meeting 122, in accordance with some implementations of the present disclosure. A processing device, having one or more central processing units (CPU(s)), one or more graphics processing units (GPU(s)), and/or memory devices communicatively coupled to the one or more CPU(s) and/or GPU(s) can perform the method 200 and/or one or more of the method's 200 individual functions, routines, subroutines, or operations. In certain implementations, a single processing thread can perform the method 200. Alternatively, two or more processing threads can perform the method 200, each thread executing one or more individual functions, routines, subroutines, or operations of the method. In an illustrative example, the processing threads implementing the method 200 can be synchronized (e.g., using semaphores, critical sections, and/or other thread synchronization mechanisms). Alternatively, the processing threads implementing the method 200 can be executed asynchronously with respect to each other. Various operations of the method 200 can be performed in a different (e.g., reversed) order compared with the order shown in FIG. 2. Some operations of the method 200 can be performed concurrently with other operations. Some operations can be optional. In some implementations, the participant presence manager 138 performs one or more of the operations of the method 200.

At block 210, processing logic obtains a first frame of a video stream generated by a camera of a client device 102A of a participant of a virtual meeting 122. In some implementations, the application 105A of the client device 102A, 104 obtains the first frame from the camera of the client device 102A and provides the first frame to the participant presence manager 138.

In some implementations, the first frame includes an image of the background of the participant. The background may include objects in an area where the client device 102A-N, 104 is located (e.g., furniture, walls, a floor, a ceiling, etc.). In some implementations, the first frame includes an image of the participant in an area of the first frame. The application 105A can remove the image of the participant from the area, or the application 105A can provide the first frame to the participant presence manager 138, and the participant presence manager 138 can remove the image of the participant. As a result, the first frame may include an image of the background with a blank space in the area where the image of the participant used to be located.

As used herein, the term "background" may refer to an area in a virtual meeting participant's visual item that surrounds the image of the participant. The background may include a real physical background, which may include a location and one or more objects near the participant and that are viewable from the participant's video camera. The background may include a virtual background, which may include an image over which an image of the participant is superimposed and replaces the participant's real physical background during the virtual meeting.

Figure 3:
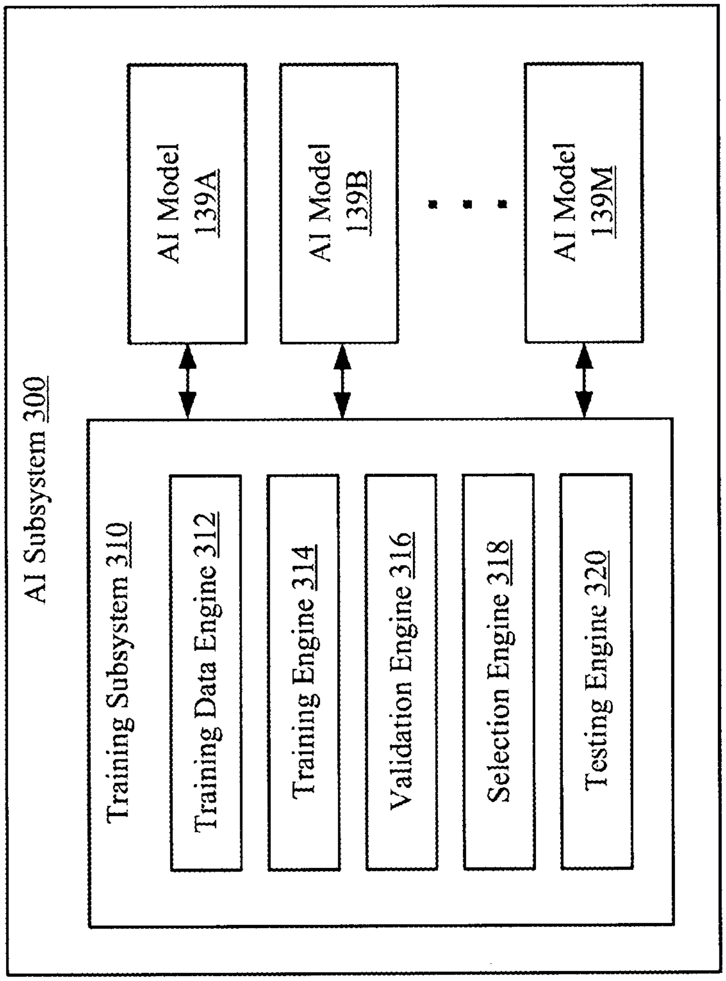
FIG. 3 illustrates a schematic block diagram for an artificial intelligence (AI) subsystem of a virtual meeting platform, in accordance with some implementations of the present disclosure.

In one implementation, the participant presence manager 138 causes a trained AI model 139A-M to fill the area. FIG. 3 illustrates an example AI subsystem 300 that can be used to train the AI model 139A-M, in accordance with implementations of the present disclosure. As illustrated in FIG. 3, the AI subsystem 300 can include a training subsystem 310, which may include a training data engine 312, a training engine 314, a validation engine 316, a selection engine 318, or a testing engine 320. The AI subsystem 300 may include one or more AI models 139A-M.

In one implementation, an AI model 139A-M includes one or more of artificial neural networks (ANNs), decision trees, random forests, support vector machines (SVMs), clustering-based models, Bayesian networks, or other types of machine learning models. ANNs generally include a feature representation component with a classifier or regression layers that map features to a target output space. The ANN can include multiple nodes ("neurons") arranged in one or more layers, and a neuron may be connected to one or more neurons via one or more edges ("synapses"). The synapses can perpetuate a signal from one neuron to another, and a weight, bias, or other configuration of a neuron or synapse can adjust a value of the signal. Training the ANN may include adjusting the weights or other features of the ANN based on an output produced by the ANN during training.

An ANN may include, for example, a convolutional neural network (CNN), recurrent neural network (RNN), or a deep neural network. A CNN, a specific type of ANN, hosts multiple layers of convolutional filters. Pooling is performed, and non-linearities may be addressed, at lower layers, on top of which a multi-layer perceptron is commonly appended, mapping top layer features extracted by the convolutional layers to decisions (e.g., classification outputs). A deep network may include an ANN with multiple hidden layers or a shallow network with zero or a few (e.g., 1-2) hidden layers. Deep learning is a class of machine learning algorithms that use a cascade of multiple layers of nonlinear processing units for feature extraction and transformation. Each successive layer uses the output from the previous layer as input. An RNN is a type of ANN that includes a memory to enable the ANN to capture temporal dependencies. An RNN is able to learn input-output mappings that depend on both a current input and past inputs. The RNN will address past and future measurements and make predictions based on this continuous measurement information. One type of RNN that can be used is a long short term memory (LSTM) neural network.

ANNs can learn in a supervised (e.g., classification) or unsupervised (e.g., pattern analysis) manner. Some ANNs (e.g., such as deep neural networks) may include a hierarchy of layers, where the different layers learn different levels of representations that correspond to different levels of abstraction. In deep learning, each level learns to transform its input data into a slightly more abstract and composite representation.

In one implementation, an AI model 139A-M includes a generative AI model. A generative AI model can deviate from a machine learning model based on the generative AI model's ability to generate new, original data, rather than making predictions based on existing data patterns. A generative AI model can include a generative adversarial network (GAN), a variational autoencoder (VAE), a large language model (LLM), or a diffusion model. In some instances, a generative AI model can employ a different approach to training or learning the underlying probability distribution of training data, compared to some machine learning models. For instance, a GAN can include a generator network and a discriminator network. The generator network attempts to produce synthetic data samples that are indistinguishable from real data, while the discriminator network seeks to correctly classify between real and fake samples. Through this iterative adversarial process, the generator network can gradually improve its ability to generate increasingly realistic and diverse data.

Generative AI models also have the ability to capture and learn complex, high-dimensional structures of data. One aim of generative AI models is to model underlying data distribution, allowing them to generate new data points that possess the same characteristics as training data. Some machine learning models (e.g., that are not generative AI models) focus on optimizing specific prediction of tasks.

In some implementations, an AI model 139A-M is an AI model that has been trained on a corpus of data. For example, the AI model 139A-M can be an AI model that is first pre-trained on a corpus of data to create a foundational model, and afterwards fine-tuned on more data pertaining to a particular set of tasks to create a more task-specific, or targeted, model. The foundational model can first be pre-trained using a corpus of data that can include data in the public domain, licensed content, and/or proprietary content. Such a pre-training can be used by the AI model 139A-M to learn broad elements including, image or speech recognition, general sentence structure, common phrases, vocabulary, natural language structure, and other elements. In some implementations, this first foundational model is trained using self-supervision, or unsupervised training on such datasets.

In some implementations, the second portion of training, including fine-tuning, includes unsupervised, supervised, reinforced, or any other type of training. In some implementations, this second portion of training includes some elements of supervision, including learning techniques incorporating human or machine-generated feedback, undergoing training according to a set of guidelines, or training on a previously labeled set of data, etc. In a non-limiting example associated with reinforcement learning, the outputs of the AI model 139A-M while training may be ranked by a user, according to a variety of factors, including accuracy, helpfulness, veracity, acceptability, or any other metric useful in the fine-tuning portion of training. In this manner, the AI model 139A-M can learn to favor these and any other factors relevant to users when generating a response. Further details regarding training are provided below.

In some implementations, an AI model 139A-M includes one or more pre-trained models, or fine-tuned models. In a non-limiting example, in some implementations, the goal of the "fine-tuning" can be accomplished with a second, or third, or any number of additional models. For example, the outputs of the pre-trained model may be input into a second AI model that has been trained in a similar manner as the "fine-tuned" portion of training above. In such a way, two more AI models may accomplish work similar to one model that has been pre-trained, and then fine-tuned.

As indicated above, an AI model 139A-M may be one or more generative AI models, allowing for the generation of new and original content. In one implementation, a generative AI model includes a diffusion model. A diffusion model may include a deep generative model that can be used to generate images, edit existing images, and create new image styles. The diffusion model may have been trained by iteratively applying a diffusion process to an input image, which may include gradually adding noise to the image until it becomes unrecognizable. The diffusion model then learns to reverse this process, starting from the noisy image and gradually denoising it until it becomes a recognizable image. In some implementations, the diffusion model may have been trained on multiple virtual meeting backgrounds by using different virtual meeting backgrounds as input images during the training process.

In one implementation, the training subsystem 310 manages the training and testing of an AI model 139A-M. The training data engine 312 can generate training data (e.g., a set of training inputs such as noisy virtual meeting background images and a set of target outputs such as respective denoised virtual meeting background images) to train an AI model 139A-M. In an illustrative example, the training data engine 312 can initialize a training set T to null (e.g., { }). The training data engine 312 can add the training data to the training set T and can determine whether training set T is sufficient for training a AI model 139A-M. The training set T can be sufficient for training the AI model 139A-M if the training set T includes a threshold amount of training data, in some implementations. In response to determining that the training set T is not sufficient for training, the training data engine 312 can identify additional data to use as training data. In response to determining that the training set T is sufficient for training, the training data engine 312 can provide the training set T to the training engine 314.

The training engine 314 can train an AI model 139A-M using the training data (e.g., training set T). The AI model 139A-M may refer to the model artifact that is created by the training engine 314 using the training data, where such training data can include training inputs and, in some implementations, corresponding target outputs. The training engine 314 can input the training data into the AI model 139A-M so that the AI model 139A-M can find patterns in the training data and configure itself based on those patterns.

Where the AI model 139A-M uses supervised learning, the training engine 314 can assist the AI model 139A-M in determining whether the AI model 139A-M maps the training input to the target output. Where the AI model 139A-M uses unsupervised learning, the training engine 314 can input the training data into the AI model 139A-M The AI model 139A-M can configure itself based on the input training data, but since the training data may not include a target output, the training engine 314 may not assist the AI model 139A-M in determining whether the AI model 139A-M provided a correct output during the training process.

The validation engine 316 may be capable of validating a trained AI model 139A-M using a corresponding set of features of a validation set from the training data engine 312. The validation engine 316 can determine an accuracy of each of the trained AI models 139A-M based on the corresponding sets of features of the validation set. Where the training data may not include a target output, validating a trained AI model 139A-M may include obtaining an output from the AI model 139A-M and providing the output to another entity for evaluation. The other entity may include another AI model configured to evaluation the output of the AI model 139A-M that is undergoing training. The other entity may include a human. The validation engine 316 can discard a trained AI model 139A-M that has an accuracy that does not meet a threshold accuracy or that otherwise fails evaluation. In some implementations, the selection engine 318 is capable of selecting a trained AI model 139A-M that has an accuracy that meets a threshold accuracy. In some implementations, the selection engine 318 may be capable of selecting the trained AI model 139A-M that has the highest accuracy of multiple trained AI models 139A-M. In some implementations, the selection engine 318 receives input from another AI model or a human and can select a trained AI model 139A-M based on the input.

The testing engine 320 may be capable of testing a trained AI model 139A-M using a corresponding set of features of a testing set from the training data engine 312. For example, a first trained AI model 139A that was trained using a first set of features of the training set may be tested using the first set of features of the testing set. The testing engine 320 can determine a trained AI model 139A-M that has the highest accuracy or other evaluation of all of the trained AI models 139A-M based on the testing sets.

In one implementation, the training engine 314 trains an AI model 139A. The training data engine 312 can generate training data that includes images of virtual meeting backgrounds, and the training engine 314 can cause the AI model 139A to undergo a diffusion model training process using the training data. The AI model 139A can undergo a validation and testing process using the validation engine 316 and testing engine 320.

In some implementations, the AI subsystem 300 and/or the participant presence manager 138 include a predictive component. The predictive component can be configured to feed data as input to an AI model 139A-M, e.g., training data or an image from the participant presence manager 138. The predictive component can be configured to obtain one or more outputs from the one or more AI models 139A-M and provide the one or more outputs to the AI subsystem 300 or the participant presence manager 138.

In some implementations, the AI subsystem 300 is part of the server 130, the virtual meeting manager 132, or the participant presence manager 138. Alternatively, the AI subsystem 300 may be part of another server, system, sub-system, or it may be an independent system. In some implementations, the AI subsystem 300 provides the trained one or more AI models 139A-M to the participant presence manager 138.

Returning to block 210 of FIG. 2, in some implementations, an AI model 139A fills an area of the first frame where the image of the participant used to be located. In one implementation, the predictive component of the participant presence manager 138 receives the first frame with the image of the background and the blank area from the participant presence manager 138 and provides the first frame as input to the AI model 139A. The AI model 139A can fill the area with image data such that the area is not blank and blends into the original portion of the image of the background. The resulting filled-in first frame that is output by the AI model 139A can be obtained by the predictive component, which can provide the resulting filled-in first frame to the participant presence manager 138.

In one implementation, block 210 occurs at a virtual meeting preparation phase of the virtual meeting 122. The preparation phase may include a UI 108A of the application 105A where the participant prepares to enter the virtual meeting 122. While in the preparation screen, video stream processor 134 may not stream video or audio from the participant's client device 102A to one or more other client devices 102B-N, 104. The preparation screen can allow the participant to adjust audio or microphone levels, get positioned in front of the camera of the client device 102A, or perform other virtual meeting 122 preparation tasks. The preparation screen can allow the participant presence manager 138 to obtain the first frame of the video stream of the client device 102A. The preparation screen can allow for the participant presence manager 138 to modify the first frame to remove the image of the participant and fill in the image of the background, as discussed above.

At block 220, processing logic generates a depth map of the first frame. The depth map may include an image representing a three-dimensional area. Each pixel of the image includes data indicating a distance from the point in the three-dimensional area represented by that pixel to a viewpoint (e.g., the camera of the client device 102A). In a visual version of the image, each pixel may include a greyscale value where a darker shade indicates that the corresponding point is closer to the camera, and a lighter shade indicates that the corresponding point is further away from the camera.

Figure 4:
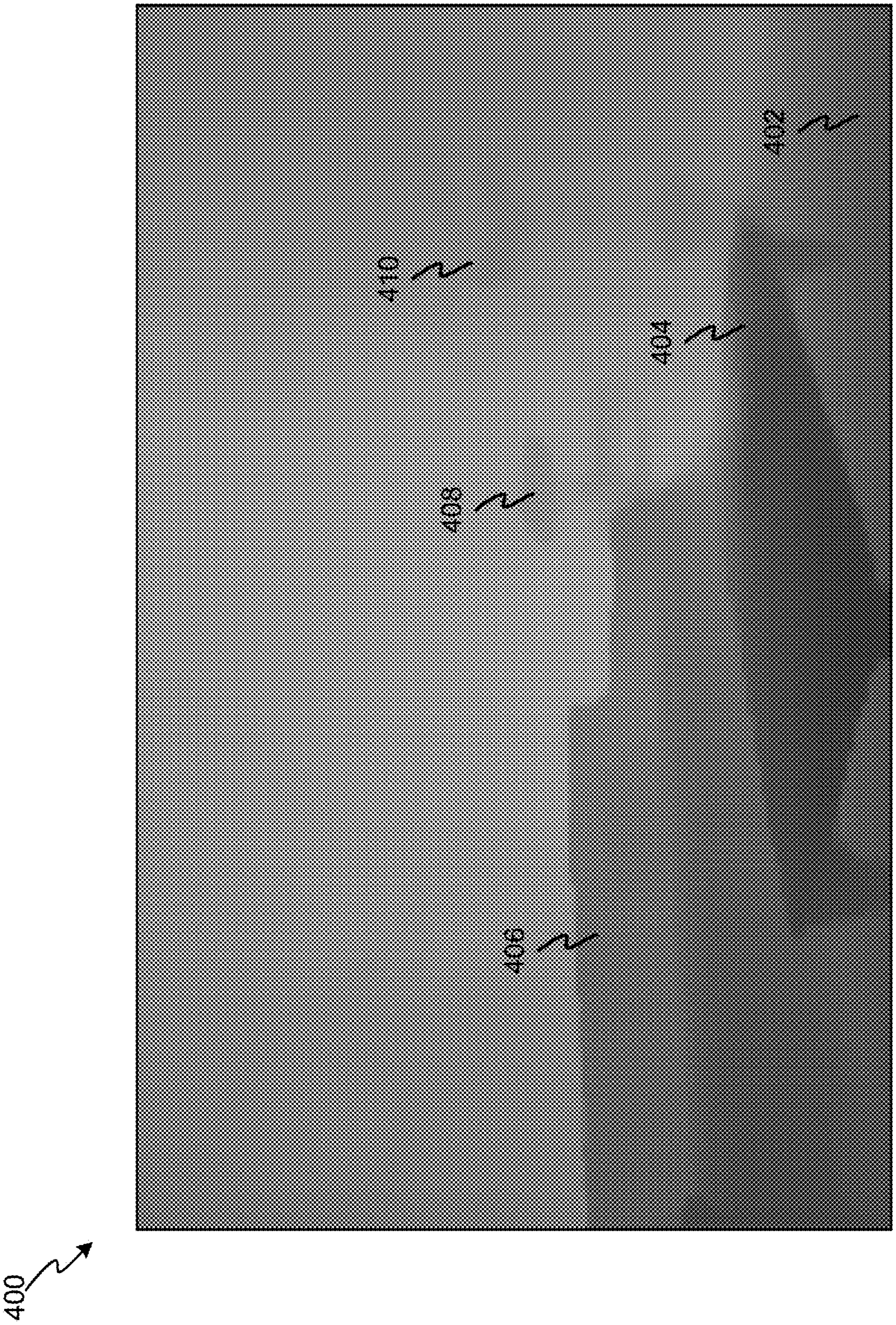
FIG. 4 illustrates an example depth map for use in detecting the presence of a virtual meeting participant, in accordance with some implementations of the present disclosure.

FIG. 4 depicts an example depth map 400 generated from the first frame. As can be seen in FIG. 4, different points in a three-dimensional space are represented by different pixels with different grayscale values. Darker pixels indicate that the point is closer to the camera, and lighter pixels indicate that the point is further away from the camera. As can also be seen in FIG. 4, the pixels can indicate the presence of objects in the background of the participant. For example, the depth map 400 depicts a floor 402 of the room, a table 404, a couch 406, a lamp 408, and a potted plant 410.

Referring back to FIG. 2, in some implementations, at block 220, processing logic further includes the participant presence manager 138 using a first generative AI model to generate the depth map 400 of the first frame. The first generative AI model can use the first frame as input. The first generative AI model may include a diffusion model. The first generative AI model may include an AI model 139B of the AI subsystem 300.

Referring back to FIG. 3, in some implementations, the training engine 314 trains the AI model 139B. The training data engine 312 can generate training data for training the AI model 139B. Each piece of training data may include an image and a corresponding ground truth that includes a depth map 400 that corresponds to the image. The training engine 314 can cause the AI model 139B to undergo a diffusion model training process using the training data. In this manner, the AI model 139B can learn to generate depth maps 400 from images. The AI model 139B can undergo a validation and testing process using the validation engine 316 and testing engine 320.

Referring back to block 220 of FIG. 2, in one implementation, the predictive component of the participant presence manager 138 receives the first frame and provides the first frame to the AI model 139B. The AI model 139B can execute and generate a depth map 400 based on the first frame. The AI model 139B can apply a diffusion denoising process to the input first frame to generate an output image. The output image may be similar to the input first frame, but since the AI model 139B applied the diffusion denoising process configured to generate depth map 400, the output image may resemble a depth map 400 slightly more than the input image. The AI model 139B can use the output image as input and can apply another diffusion denoising process and output a second output image. The AI model 139B can iteratively repeat this process until a stop condition is detected (e.g., a predetermined number of iterations have executed, the differences between the input and output images are below a threshold difference, etc.). The AI model 139B can provide the output depth map 400 to the predictive component 139, which can provide it to the participant presence manager 138.

For each of one or more second frames of the video stream, at block 230, processing logic generates a point cloud of an image of the participant. The image of the participant may be located in a respective second frame of the video stream. A point cloud may include a data structure that includes multiple data points in a three-dimensional space. Each point may include data indicating the location of that point in the three-dimensional space (e.g., X, Y, and Z coordinates). In some implementations, the point cloud includes a dense point cloud. A dense point cloud may include a point cloud with a high concentration of points.

Figure 5:
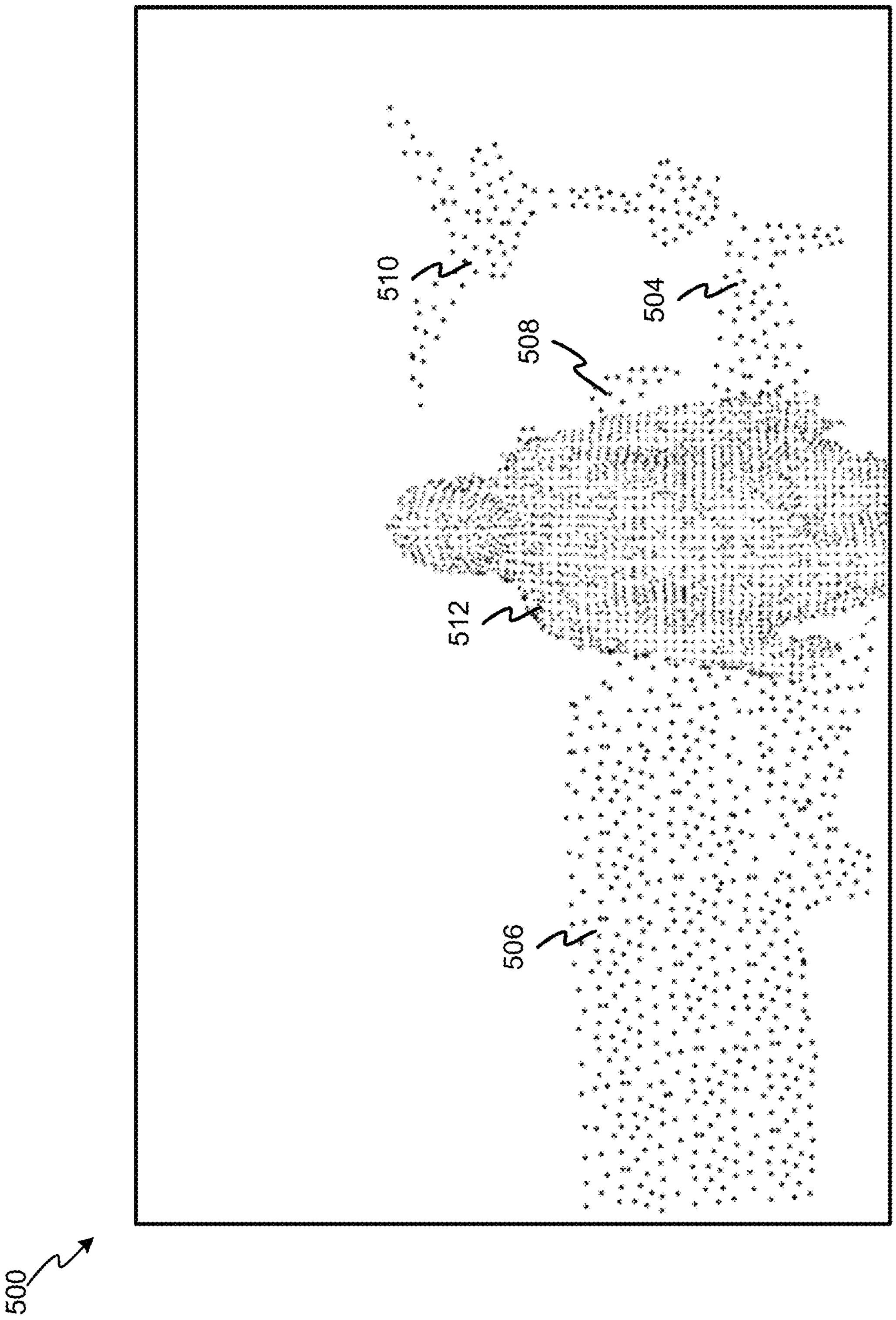
FIG. 5 depicts an example point cloud for use in detecting the presence of a virtual meeting participant, in accordance with some implementations of the present disclosure.

In one implementation, generating the point cloud of an image of the participant includes generating a point cloud of the image of the second frame. Generating a point cloud of the image of the second frame may include generating points in the point cloud for objects in the second frame other than the participant. FIG. 5 depicts an example point cloud 500 generated in block 230. The point cloud 500 includes points for the various objects shown in FIG. 4 (e.g., points 504 corresponding to the table 404, points 506 corresponding to the couch 406, points 508 corresponding to the lamp 408, and points 510 corresponding to the potted plant 410). The point cloud 500 may include points 512 that correspond to the participant.

Referring back to FIG. 2, in one implementation, block 230 of the method 200 includes the participant presence manager 138 using a second generative AI model to generate the point cloud 500. The second generative AI model can use the second frame as input. In some implementations, the second generative AI model includes a generative diffusion model. The second generative AI model may include an AI model 139C of the AI subsystem 300.

Referring back to FIG. 3, in some implementations, the training engine 314 trains the AI model 139C. The training data engine 312 can generate training data for training the AI model 139C. Each piece of training data may include an image and a corresponding ground truth that includes a point cloud 500 that corresponds to the image. The training engine 314 can cause the AI model 139C to undergo a diffusion model training process using the training data. In this manner, the AI model 139B can learn to generate point clouds 500 from images. The AI model 139C can undergo a validation and testing process using the validation engine 316 and testing engine 320.

Referring back to block 230 of FIG. 2, in one implementation, the predictive component receives the second frame and provides the second frame to the AI model 139C. The AI model 139C can execute and generate a point cloud 500 based on the first frame. The AI model 139C can apply a diffusion denoising process to the input second frame to generate an output image. The output image may be similar to the input second frame, but since the AI model 139C applied the diffusion denoising process configured to generate a point cloud 500, the output image can resemble a point cloud 500 slightly more than the input image. The AI model 139C can use the output image as input and can apply another diffusion denoising process and output a second output image. The AI model 139C can iteratively repeat this process until a stop condition is detected. The AI model 139C can provide the output point cloud 500 to the predictive component 139, which can provide it to the participant presence manager 138.

In some implementations, the first generative AI model is larger than the second generative AI model. For example, where the first and second generative AI models include ANN-based generative AI models, the first generative AI model may include more neurons, more synapses, or more layers than the second generative AI model. Where the first and second generative AI models are diffusion generative models, the first generative AI model can perform more diffusion steps than the second generative AI model. In some implementations, the first generative AI model is larger than the second because the first can execute once on the first frame while the second generative AI model can execute multiple times on multiple second frames. In one implementation, processing logics perform block 230 multiple times per second (e.g., 10 times per second).

In one implementation, the participant presence manager 138 compares the point cloud 500 to the depth map 400 to determine which points of the point cloud 500 correspond to the participant. The participant presence manager 138 can determine that a point of the point cloud 500 corresponds to an object in the depth map 400 by determining that the location of the point is within a threshold value of a pixel of the depth map 400. Responsive to a point of the point cloud 500 corresponding to an object of the depth map 400, the participant presence manager 138 can remove the point from the point cloud 500. After the comparison of the point cloud 500 to the depth map 400, the only points remaining in the point cloud 500 can correspond to the participant.

For each of one or more second frames of the video stream, at block 240, processing logic determines whether the participant is in front of the camera. Determining that the participant is in front of the camera may be based on an overlap between a selected zone of the depth map 400 and the point cloud 500 of the image of the participant located in the respective second frame.

Figure 6:
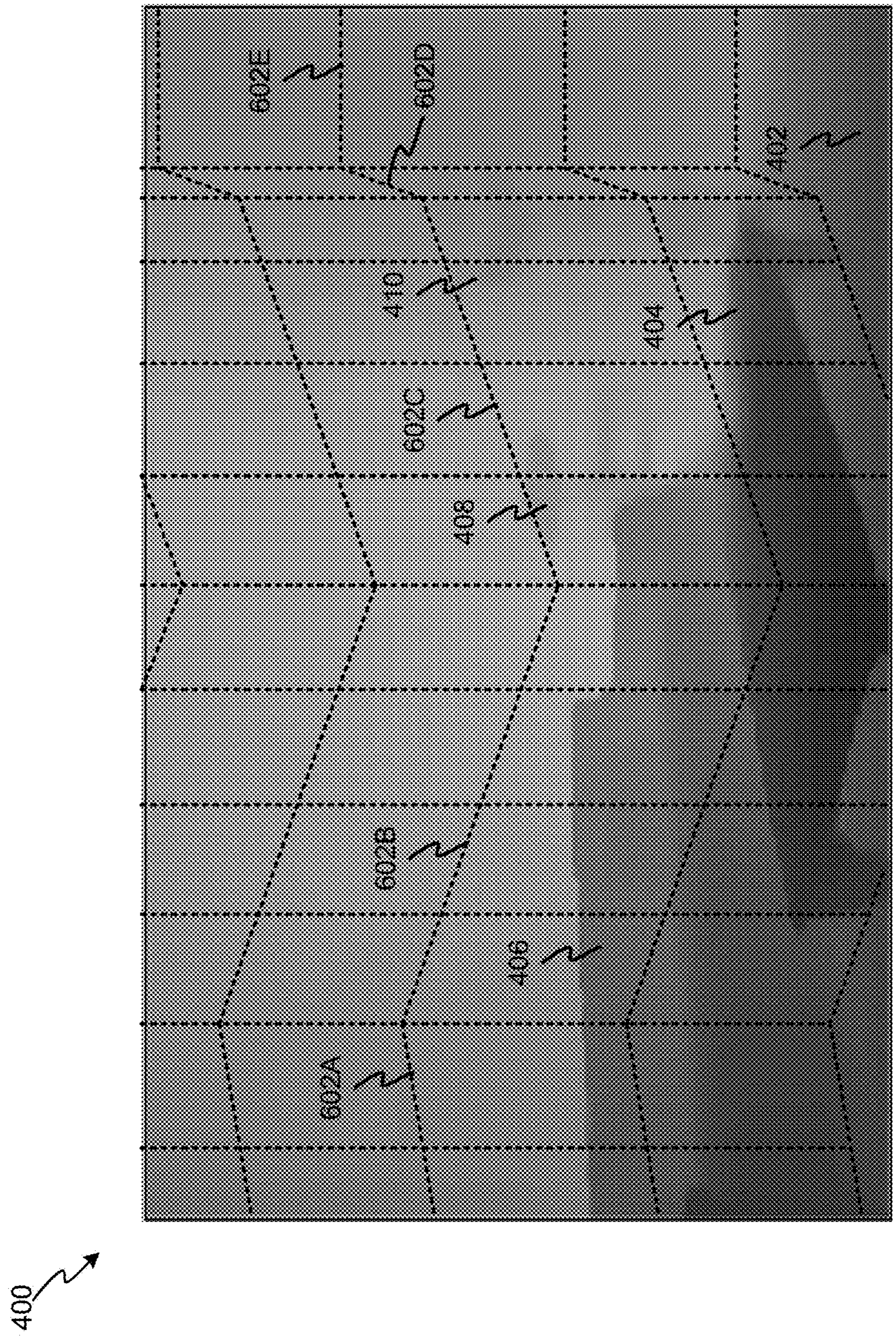
FIG. 6 depicts an example depth map with boundaries of a selected zone, in accordance with some implementations of the present disclosure.

In one implementation, the selected zone of the depth map 400 includes a portion of the depth map 400 designated as the area in which at least some of the participant is located in order to have the participant's camera and audio active. FIG. 6 depicts one implementation of the depth map 400 with a selected zone designated in the depth map 400. As can be seen in FIG. 6, the depth map 400 is shown with the various objects 402-410. Boundaries 602A-E of the selected zone area are also shown. The boundaries 602A-E may be represented by vertical planes. For example, the first boundary 602A may include a vertical plane located partially in front of the couch 406. The second boundary 602B may include a vertical plane located in front of a side of the table 404. The third boundary 602C may include a vertical plane located in front of another side of the table 404. The fourth boundary 602D and the fifth boundary 602E may include vertical planes located in front of the potted plant 410. The selected zone may include the area between the boundaries 602A-E and the camera.

Returning to block 240 of FIG. 2, in one implementation, the participant provides user input, and the participant presence manager 138 can designate the selected zone based on the user input. For example, the participant presence manager 138 can cause the depth map 400 to be displayed on the UI 108A of the participant's client device 102A. The UI 108A may include functionality allowing the participant to select portions of the depth map 400 (e.g., one or more of the boundaries 602A-E) to be designated as the selected zone.

In some implementations, the participant presence manager 138 automatically designates a portion of the depth map 400 as the selected zone. The participant presence manager 138 can designate a portion of the depth map 400 that is in front of one or more objects indicated in the depth map 400 as the selected zone. As an example, in FIG. 6, the participant presence manager 138 can designate a portion of the space in front of the table 404 as the selected zone since that portion is in front of the table 404. However, the participant presence manager 138 may not designate the area between the table 404 and the couch 406 or the area between the table 404 and the potted plant 410 as part of the selected zone because those areas are behind the table 404. In some implementations, the participant presence manager 138 designates, as the selected zone, the portion of the area that is within a threshold distance from the camera. The threshold distance may include a predetermine distance (e.g., 5 feet (approx. 1.5 meters) from the camera) or a distance from the camera to the closest object. In some implementations, the participant provides user input, and the participant presence manager 138 adjusts a boundary of the selected zone based on the user input.

In one implementation, determining whether the participant is in front of the camera based on the overlap between the selected zone and the point cloud 500 includes determining whether a threshold amount of the multiple points of the point cloud 500 are located within the selected zone of the depth map 400. The threshold amount may include a majority of the points of the point cloud 500. The threshold amount may include at least one point of the point cloud 500.

Referring back to FIG. 2, in some implementations, the method 200 further includes, responsive to determining that the participant is not in front of the camera, causing a first audio/video setting action to be performed. The first audio/video setting action may include muting a microphone and/or camera of the client device 102A. Muting the microphone may include the application 105A not streaming audio to the virtual meeting manager 132, or the virtual meeting manager 132 not streaming the audio associated with the participant's client device 102A to other client devices 102B-N, 104. Muting the camera may include the application 105A not providing a video stream to the virtual meeting manager 132, or the virtual meeting manager 132 not providing the video stream associated with the participant's client device 102A to other client devices 102B-N, 104.

In one implementation, the method 200 includes, responsive to determining that the participant is in front of the camera, causing a second audio/video setting action to be performed. The second audio/video setting action may include unmuting the microphone and/or camera of the client device 102A. The application 105A can cause the client device 102A to perform an alert action to inform the user that the camera or audio are active. The alert may include an auditory or a visual alert presented on the UI 108A-N. In some implementations, causing the second audio/video setting action to be performed is in further response to previously causing the first audio/video setting action to be performed. For example, during the virtual meeting 122, the participant associated with the client device 102A may step away from the camera. The participant presence manager 138 can perform block 240 and determine that the participant is not in front of the camera and, in response, can cause the application 105A to automatically mute the client device's 102A microphone and camera. The participant may step back in front of the camera at a later time. The participant presence manager 138 can perform block 240 again and determine that the participant is now in front of the camera and, in response, can cause the application 105A to automatically unmute the client device's 102A microphone and camera.

In some implementations, blocks 230 and 240 occur during a live phase of the virtual meeting 122. A live phase may refer to a phase in which virtual meeting participants are able to interact with each other (e.g., view or hear each other in real-time (or near real-time due to transmission delays, etc.) during the virtual meeting 122). The live phase may include the client devices 102A-N, 104 of the virtual meeting participants providing their respective video streams and/or respective audio streams to the virtual meeting manager 132, and the virtual meeting manager 132 broadcasting the video and audio streams to the one or more client devices 102A-N, 104 such that the participants can view or hear each other in the virtual meeting 122.

In some implementations, the participant presence manager 138 re-performs the method 200 after a first execution of the method 200. This may be responsive to receiving user input from the participant indicating that the participant presence manager 138 is to re-perform the method 200. The participant can provide the user input, for example, in response to the user moving the client device 102A to another location and, thus, the depth map 400, as originally created, may no longer apply or be up to date. In some implementations, the participant presence manager 138 automatically re-performs the method 200 responsive to detecting that the depth map 400 no longer applies or is out-of-date. The participant presence manager 138 can detect that the depth map 400 no longer applies responsive to the point cloud 500 varying significantly from the depth map 400.

Figure 7:
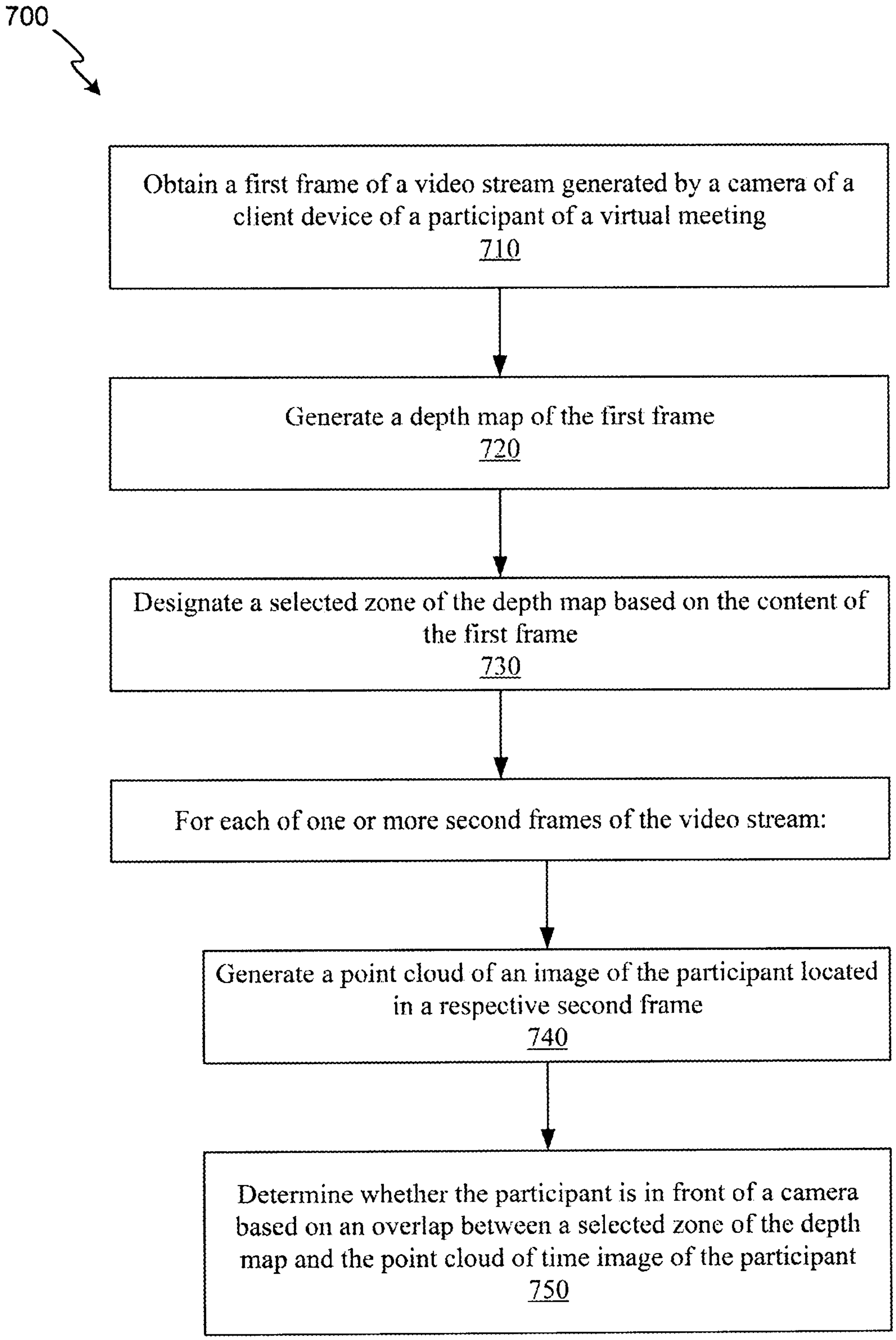
FIG. 7 depicts a flow diagram of a method for detecting the presence of a virtual meeting participant, in accordance with some implementations of the present disclosure.

FIG. 7 is a flowchart illustrating one embodiment of a method 700 for detecting the presence of a participant during a virtual meeting 122, in accordance with some implementations of the present disclosure. A processing device, having one or more CPU(s), one or more (s), and/or memory devices communicatively coupled to the one or more CPU(s) and/or GPU(s) can perform the method 700 and/or one or more of the method's 700 individual functions, routines, subroutines, or operations. In certain implementations, a single processing thread can perform the method 700. Alternatively, two or more processing threads can perform the method 700, each thread executing one or more individual functions, routines, subroutines, or operations of the method. In an illustrative example, the processing threads implementing the method 700 can be synchronized (e.g., using semaphores, critical sections, and/or other thread synchronization mechanisms). Alternatively, the processing threads implementing the method 700 can be executed asynchronously with respect to each other. Various operations of the method 700 can be performed in a different (e.g., reversed) order compared with the order shown in FIG. 7. Some operations of the method 700 can be performed concurrently with other operations. Some operations can be optional. In some implementations, the participant presence manager 138 can perform one or more of the operations of the method 700.

At block 710, processing logic obtains a first frame of a video stream generated by a camera of a client device 102A of a participant of a virtual meeting 122. Block 710 may include functionality similar to the functionality of block 210 of the method 200. At block 720, processing logic generates a depth map 400 of the first frame. Block 720 may include functionality similar to the functionality of block 220 of the method 200.

At block 730, processing logic designates a selected zone of the depth map 400 based on content of the depth map 400. As discussed above, the content of the depth map 400 may include objects (e.g., the objects 402-410) indicated by pixels of the depth map 400. As discussed above, in some implementations, the participant presence manager 138 automatically designates a portion of the depth map 400 as the selected zone. Designating the selected zone may include the participant presence manager 138 including one or more boundaries 602A-N in the depth map 400, as discussed above. In some implementations, designating the selected zone of the depth map 400 based on content of the depth map 400 may include designating a portion of the depth map 400 within a threshold distance as within the selected zone, as discussed above. In one implementation, designating the selected zone of the depth map 400 based on content of the depth map 400 includes designating a portion of the depth map 400 located behind a piece of furniture as outside the selected zone, as discussed above. In one or more implementations, the participant presence manager 138 adjusts a boundary 602 of the selected zone of the depth map 400 based on user input received from the client device 102A.

For each of one or more second frames of the video stream, at block 740, processing logic generates a point cloud 500 of an image of the participant located in a respective second frame. Block 740 may include functionality similar to the functionality of block 230 of the method 200. For each of one or more second frames of the video stream, at block 750, processing logic determines whether the participant is in front of the camera. The processing logic may do this based on an overlap between a selected zone of the depth map 400 and the point cloud 500 of the image of the participant located in the respective second frame. Block 750 may include functionality similar to the functionality of block 240 of the method 200.

Figure 8:
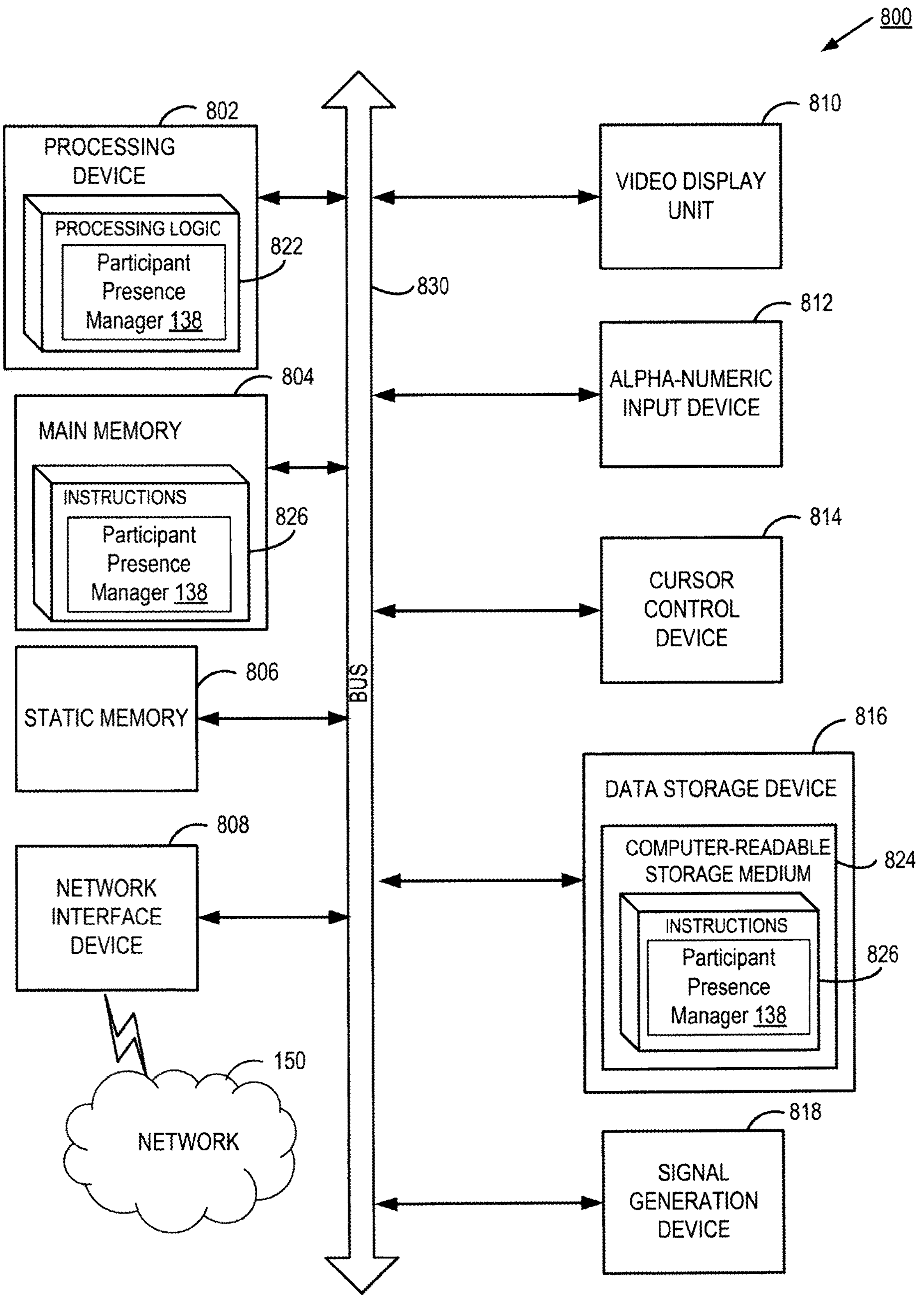
FIG. 8 is a block diagram illustrating an exemplary computer system, in accordance with some implementations of the present disclosure.

FIG. 8 is a block diagram illustrating an exemplary computer system, in accordance with implementations of the present disclosure. The computer system 800 can include a client device 102A-N, 104, the virtual meeting platform 120, or the server 130 in FIG. 1. The machine can operate in the capacity of a server or an endpoint machine, in an endpoint-server network environment, or as a peer machine in a peer-to-peer (or distributed) network environment. The machine can be a television, a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 800 includes a processing device (processor) 802, a main memory 804 (e.g., read-only memory (ROM), flash memory, dynamic random access memory (DRAM) such as synchronous DRAM (SDRAM), double data rate (DDR SDRAM), or DRAM (RDRAM), etc.), a static memory 806 (e.g., flash memory, static random access memory (SRAM), etc.), and a data storage device 816, which communicate with each other via a bus 830.

The processing device 802 represents one or more general-purpose processing devices such as a microprocessor, central processing unit, or the like. More particularly, the processing device 802 can be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 802 can also be one or more special-purpose processing devices such as an application specific integrated circuit (ASIC), a field programmable gate array (FPGA), a digital signal processor (DSP), network processor, or the like. The processing device 802 is configured to execute the processing logic 822 for performing the operations discussed herein (e.g., the operations of the participant presence manager 138).

The computer system 800 can further include a network interface device 808. The computer system 800 also can include a video display unit 810 (e.g., a liquid crystal display (LCD) or a cathode ray tube (CRT)), an input device 812 (e.g., a keyboard, and alphanumeric keyboard, a motion sensing input device, touch screen), a cursor control device 814 (e.g., a mouse), and a signal generation device 818 (e.g., a speaker).

The data storage device 816 can include a non-transitory machine-readable storage medium 824 (sometimes referred to as a "computer-readable storage medium") on which is stored one or more sets of instructions 826 (e.g., the instructions to carry out one or more operations of the participant presence manager 138) embodying any one or more of the methodologies or functions described herein. The instructions can also reside, completely or at least partially, within the main memory 804 and/or within the processing device 802 during execution thereof by the computer system 800, the main memory 804 and the processing device 802 also constituting machine-readable storage media. The instructions can further be transmitted or received over the network 150 via the network interface device 808.

In one implementation, the instructions 826 include instructions for determining visual items for presentation in a user interface of a virtual meeting. While the computer-readable storage medium 824 (machine-readable storage medium) is shown in an exemplary implementation to be a single medium, the terms "computer-readable storage medium" and "machine-readable storage medium" should be taken to include a single medium or multiple media (e.g., a centralized or distributed database, and/or associated caches and servers) that store the one or more sets of instructions. The terms "computer-readable storage medium" and "machine-readable storage medium" shall also be taken to include any medium that is capable of storing, encoding or carrying a set of instructions for execution by the machine and that cause the machine to perform any one or more of the methodologies of the present disclosure. The terms "computer-readable storage medium" and "machine-readable storage medium" shall accordingly be taken to include, but not be limited to, solid-state memories, optical media, and magnetic media.

Reference throughout this specification to "one implementation," or "an implementation," means that a particular feature, structure, or characteristic described in connection with the implementation is included in at least one implementation. Thus, the appearances of the phrase "in one implementation," or "in an implementation," in various places throughout this specification can, but are not necessarily, referring to the same implementation, depending on the circumstances. Furthermore, the particular features, structures, or characteristics can be combined in any suitable manner in one or more implementations.

To the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

As used in this application, the terms "component," "module," "system," or the like are generally intended to refer to a computer-related entity, either hardware (e.g., a circuit), software, a combination of hardware and software, or an entity related to an operational machine with one or more specific functionalities. For example, a component can be, but is not limited to being, a process running on a processor (e.g., digital signal processor), a processor, an object, an executable, a thread of execution, a program, and/or a computer. By way of illustration, both an application running on a controller and the controller can be a component. One or more components can reside within a process and/or thread of execution and a component can be localized on one computer and/or distributed between two or more computers. Further, a "device" can come in the form of specially designed hardware; generalized hardware made specialized by the execution of software thereon that enables hardware to perform specific functions (e.g., generating interest points and/or descriptors); software on a computer readable medium; or a combination thereof.

The aforementioned systems, circuits, modules, and so on have been described with respect to interact between several components and/or blocks. It can be appreciated that such systems, circuits, components, blocks, and so forth can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components can be combined into a single component providing aggregate functionality or divided into several separate sub-components, and any one or more middle layers, such as a management layer, can be provided to communicatively couple to such sub-components in order to provide integrated functionality. Any components described herein can also interact with one or more other components not specifically described herein but known by those of skill in the art.

Moreover, the words "example" or "exemplary" are used herein to mean serving as an example, instance, or illustration. Any aspect or design described herein as "exemplary" is not necessarily to be construed as preferred or advantageous over other aspects or designs. Rather, use of the words "example" or "exemplary" is intended to present concepts in a concrete fashion. As used in this application, the term "of" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Finally, implementations described herein include collection of data describing a user and/or activities of a user. In one implementation, such data is only collected upon the user providing consent to the collection of this data. In some implementations, a user is prompted to explicitly allow data collection. Further, the user can opt-in or opt-out of participating in such data collection activities. In one implementation, the collect data is anonymized prior to performing any analysis to obtain any statistical patterns so that the identity of the user cannot be determined from the collected data.

What is claimed is:

1. A method, comprising:
- obtaining a first frame of a video stream generated by a camera of a client device of a participant of a virtual meeting;
- generating, using a first generative artificial intelligence (AI) model and the first frame as input to the first generative AI model, a depth map of the first frame;
- for each of one or more second frames of the video stream:
  - generating, using a second generative AI model and a respective second frame as input to the second generative AI model, a point cloud of an image of the participant located in the respective second frame, and
  - determining whether the participant is in front of the camera based on an overlap between a selected zone of the depth map and the point cloud of the image of the participant located in the respective second frame; and
- causing at least one of an audio setting action or a video setting action to be performed based on the determining.

2. The method of claim 1, wherein the first generative AI model comprises a first generative diffusion model.

3. The method of claim 1, wherein the second generative AI model comprises a second generative diffusion model.

4. The method of claim 1, wherein:
- the point cloud comprises a plurality of points; and
- determining whether the participant is in front of the camera comprises determining whether a threshold amount of the plurality of points are located within the selected zone of the depth map.

5. The method of claim 4, wherein the threshold amount comprises a majority of the plurality of points.

6. The method of claim 1, further comprising, responsive to determining that the participant is not in front of the camera, causing an audio/video setting action to be performed, wherein the audio/video setting action comprises at least one of:
- muting a microphone of the client device of the participant in the virtual meeting; or
- deactivating the camera of the client device of the participant in the virtual meeting.

7. A system, comprising:
- a memory; and
- one or more processing devices, coupled to the memory, configured to perform one or more operations, comprising:
- obtaining a first frame of a video stream generated by a camera of a client device of a participant of a virtual meeting;
- generating, using a first generative artificial intelligence (AI) model and the first frame as input to the first generative AI model, a depth map of the first frame;
- for each of one or more second frames of the video stream:
  - generating, using a second generative AI model and a respective second frame as input to the second generative AI model, a point cloud of an image of the participant located in the respective second frame, and
  - determining whether the participant is in front of the camera based on an overlap between a selected zone of the depth map and the point cloud of the image of the participant located in the respective second frame; and
- causing at least one of an audio setting action or a video setting action to be performed based on the determining.

8. The system of claim 7, wherein the first generative AI model comprises a first generative diffusion model.

9. The system of claim 7, wherein the second generative AI model comprises a second generative diffusion model.

10. The system of claim 7, wherein:
- the point cloud comprises a plurality of points; and
- determining whether the participant is in front of the camera comprises determining whether a threshold amount of the plurality of points are located within the selected zone of the depth map.

11. The system of claim 10, wherein the threshold amount comprises a majority of the plurality of points.

12. The system of claim 7, the operations further comprising, responsive to determining that the participant is not in front of the camera, causing an audio/video setting action to be performed, wherein the audio/video setting action comprises at least one of:
- muting a microphone of the client device of the participant in the virtual meeting; or
- deactivating the camera of the client device of the participant in the virtual meeting.

13. A method, comprising:
- obtaining a first frame of a video stream generated by a camera of a client device of a participant of a virtual meeting;
- generating, using a first generative artificial intelligence (AI) model and the first frame as input to the first generative AI model, a depth map of the first frame;
- designating a selected zone of the depth map based on content of the depth map;
- for each of one or more second frames of the video stream:
  - generating, using a second generative AI model and a respective second frame as input to the second generative AI model, a point cloud of an image of the participant located in the respective second frame, and
  - determining whether the participant is in front of the camera based on an overlap between the selected zone of the depth map and the point cloud of the image of the participant located in the respective second frame; and causing at least one of an audio setting action or a video setting action to be performed based on the determining.

14. The method of claim 13, wherein designating the selected zone of the depth map based on content of the depth map comprises designating a portion of the depth map within a threshold distance as within the selected zone.

15. The method of claim 13, wherein designating the selected zone of the depth map based on content of the depth map comprises designating a portion of the depth map behind a piece of furniture as outside the selected zone.

16. The method of claim 13, further comprising adjusting a boundary of the selected zone of the depth map based on user input received from the client device.

* * * * *